Sept. 2, 1941.　　　T. B. MYERS　　　2,254,236
DRINK MIXER
Filed April 17, 1940　　　4 Sheets-Sheet 1
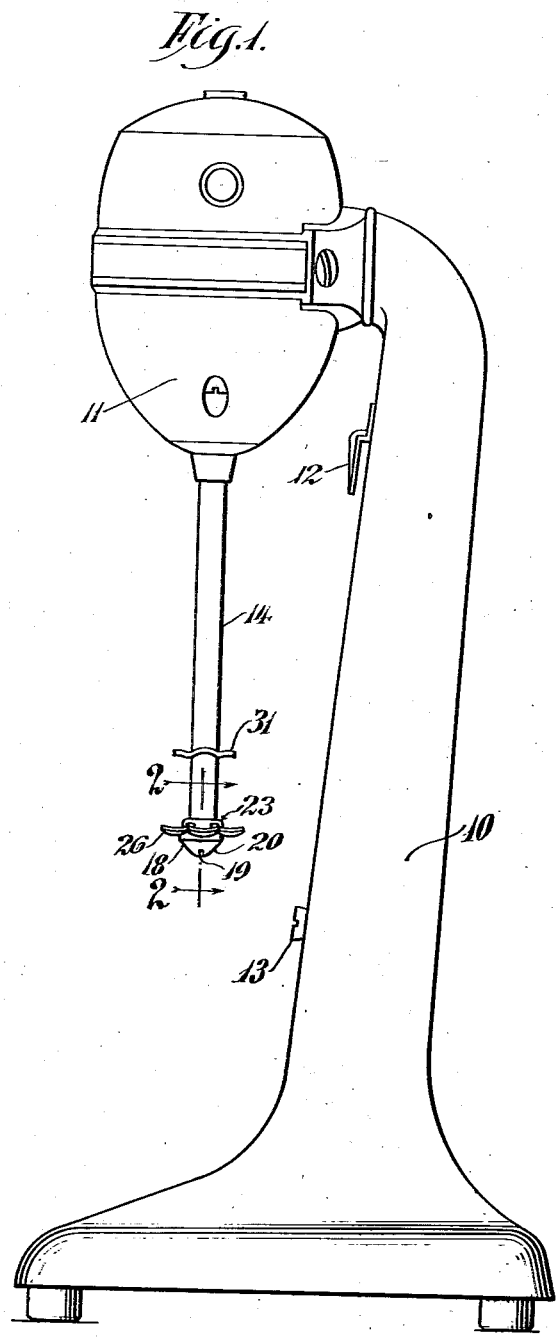
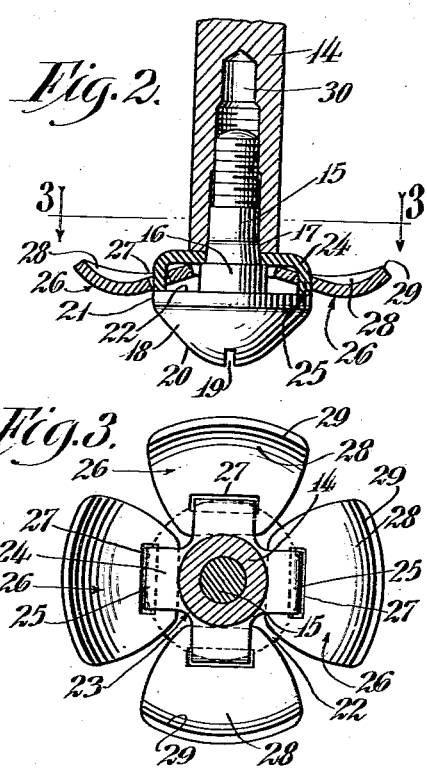
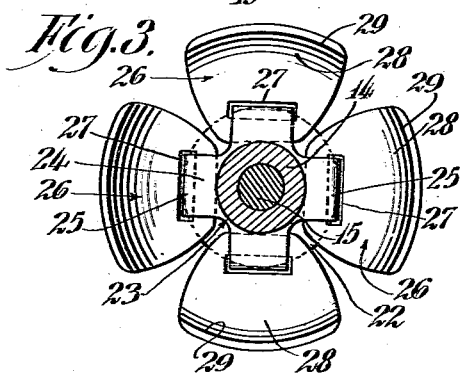
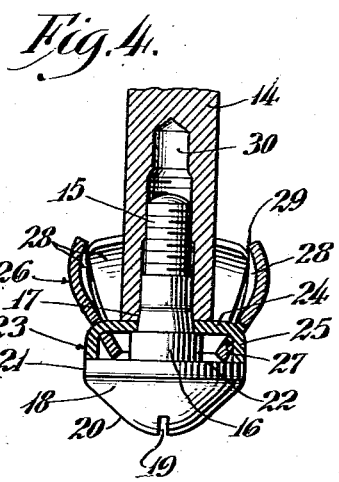
Inventor:
Thomas B. Myers,
By Bertha L. MacGregor
Attorney.

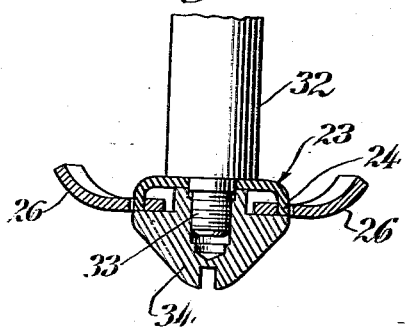
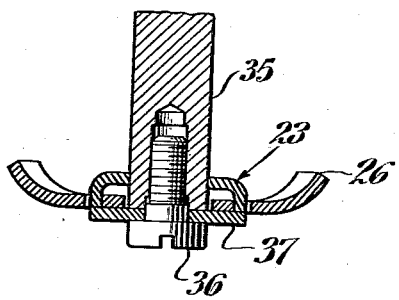
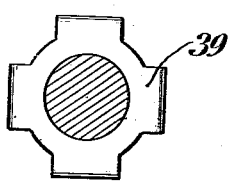
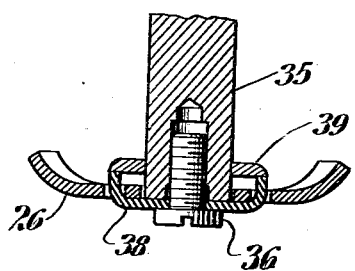
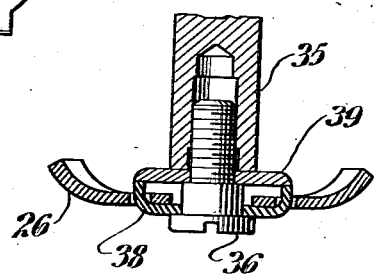
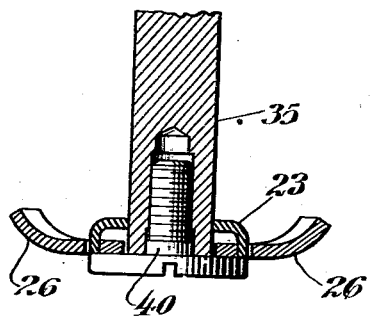
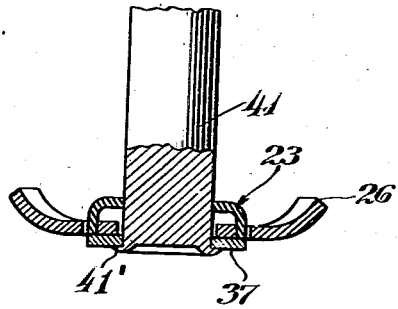

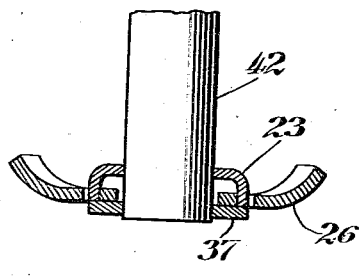
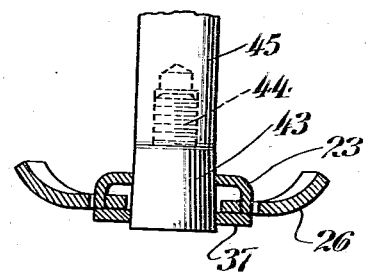
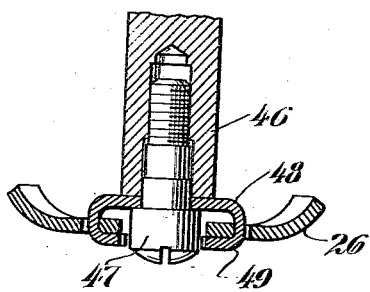
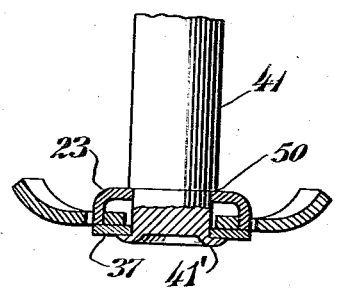
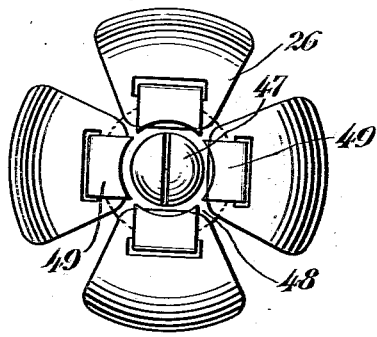
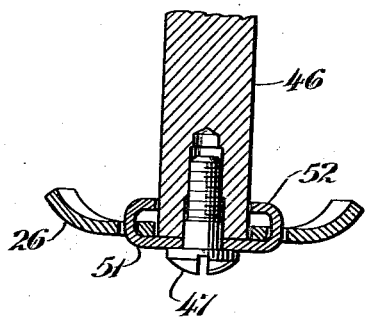

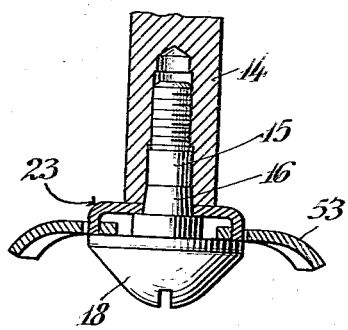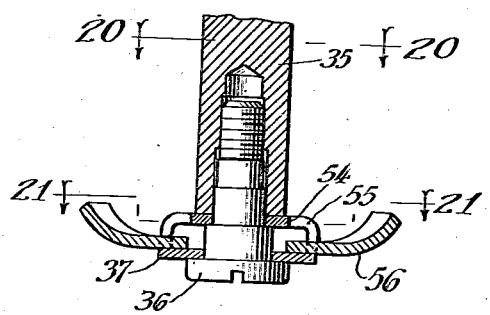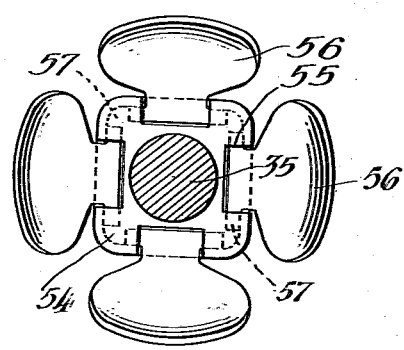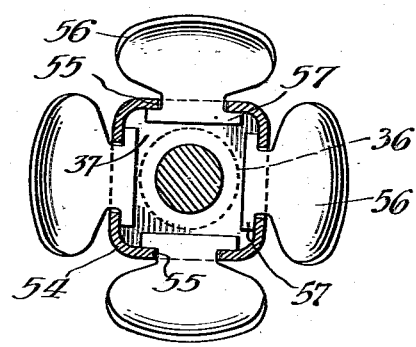

Patented Sept. 2, 1941

2,254,236

UNITED STATES PATENT OFFICE 2,254,236

DRINK MIXER

Thomas B. Myers, Racine, Wis., assignor to Scovill Manufacturing Company, Waterbury, Conn., a corporation of Connecticut Application April 17, 1940, Serial No. 330,038

5 Claims. (Cl. 259—134)

This application is a continuation-in-part of my application, Serial No. 303,350, filed November 8, 1939.

This invention relates to drink mixers, and particularly to agitators adapted for drink mixers.

One of the objects of the invention is to provide an agitator which will mix liquid or powdered or semi-solid ingredients in liquid beverages quickly and efficiently.

Another object is to provide an agitator which can be made to enter a mass of semi-solid material in a mixing receptacle without undue effort on the part of the user. Mixed drinks frequently are prepared from ice cream, milk and flavoring material, and when the ice cream is in solidly frozen condition, it is difficult to force the conventional agitator into the material to be mixed.

The drink mixer agitators in common use comprise a rotatable shaft and one or more agitator discs or buttons, rigid in construction and rigidly secured to the shaft. The diameter of such agitator buttons has been limited so as to permit the agitator to pass into the solidly frozen ice cream, but even when such agitator buttons are quite small, they obstruct the passage of the agitator as a whole into the ingredients to be mixed.

Therefore, an important object of my invention is to provide an agitator having agitator blades or vanes pivotally mounted on a shaft, automatically movable to non-obstructing positions when the agitator passes into semi-solid material and automatically movable to positions substantially at right angles to the axis of the shaft momentarily after the rotating agitator has entered the material to be mixed. The construction is such that the user may move the agitator into the contents of the mixing receptacle or move the receptacle and contents relatively to the agitator to bring the agitator into operative position easily and with much less effort than is required when using the conventional equipment now in general use.

Another advantage of the construction is the fact that when the agitator blades are in their operative or extended positions, the diameter of the agitator is substantially greater than that of conventional drink mixer agitators, the area being approximately 50% greater, whereby the efficiency of the mixer is also enhanced.

Another feature of the invention is the blade conformation which is designed to increase aeration of the drink ingredients.

In the drawings:

Fig. 1 is a side elevation of a drink mixer embodying my preferred form of agitator.

Fig. 2 is a vertical sectional view, partly in elevation, of the lower end of the agitator, on an enlarged scale, in the plane of the line 2—2 of Fig. 1.

Fig. 3 is a transverse section taken in the plane of the line 3—3 of Fig. 2.

Fig. 4 is a view similar to Fig. 2 but showing the blades in collapsed position.

Figs. 5 to 8, 10 to 15, inclusive, and 17 are vertical sectional views, partly in elevation, of the lower end of an agitator embodying modified forms of construction of the agitator shown in Figs. 1 to 4, inclusive.

Fig. 9 is a plan view of the retaining plate used in the devices of Figs. 7 and 8.

Fig. 16 is a bottom plan view of the agitator of Fig. 14.

Figs. 18 and 19 are vertical sectional views, partly in elevation, of the lower ends of agitators embodying other modified forms of construction of the invention.

Figs. 20 and 21 are horizontal sectional views taken in the planes of the lines 20—20 and 21—21, respectively, of Fig. 19.

In that embodiment of the invention shown in Figs. 1 to 4, inclusive, the drink mixer comprises a standard 10, motor 11, and means 12, 13 for holding a mixing cup or receptacle (not shown) in operative position relatively to the agitator. The agitator comprises a shaft 14 and one or more agitator buttons on the shaft.

In the preferred embodiment of my invention, the agitator button comprises a screw, plurality of movable blades, and means for mounting the blades on the screw. The screw has a threaded shank 15, a shoulder 16, beveled portion 17 and a head 18. The head has a groove 19 in its apex and surfaces 20 which slope from the apex to the peripheral portion 21 at an angle of approximately 45°. The surface 22 of the head is flat. A retaining member in the form of a cruciform piece of metal 23 is apertured centrally to fit tightly the beveled portion 17 of the shank 15, and rests on the shoulder 16. The arms 24, four in number, are bent downwardly at 25 so that the straight edges of the ends of the arms bear on the surface 22 of the head 18 adjacent the periphery 21. The arms 24 extend at right angles to each other.

The blades 26 are movably mounted on the arms 24 and are movable independently of each other. Four blades are shown but two or three blades may be used. Each blade has a rectangular slot 27 through which extends the downturned end of an arm 24. Preferably the blades are dished as indicated at 28, but they may be straight. As shown, they have well defined edges 29 on their upper surfaces. The form of the blades and the provision of the edges 29 produce marked aeration of the ingredients being mixed. The blades 26 are movable from the normal extended position shown in Figs. 1, 2 and 3 to the collapsed position shown in Fig. 4.

The agitator button is mounted on the shaft 14 by means of the screw threaded shank 15 entering a threaded bore 30 in the lower end of the shaft 14, said shaft end bearing on the assembled screw piece 23 and holding together the assembled screw 15—18 and the arms 24 carrying the vanes 26.

Additional collapsible agitator buttons may be mounted on the shaft 14, above the one shown and described, or a rigid button such as the one indicated at 31 may be used. The provision of a collapsible button at or near the lower end of the shaft where the obstructions are encountered is essential to easy passage of the agitator into semi-solid material.

In Fig. 5, the agitator shaft 32 has a screw threaded stud 33 projecting from its lower end for screw threaded engagement with a nut 34. The cruciform retaining member 23, with four arms 24, is the same as that heretofore described, as are the blades 26.

The agitator of Fig. 6 comprises a shaft 35, internally threaded to receive the screw 36. The cruciform member 23 for retaining the blades 26 has a press fit on the shaft 35, instead of being held beneath the end of the shaft, as in Figs. 2 and 5. A bottom plate 37 fits between the shaft 35 and head of the screw 36 to cooperate with the retaining member 23 to retain the blades 26.

In the agitators of Figs. 7 and 8, the retaining member is inverted and the arms are upturned instead of being turned downwardly as in the member 23. The shaft 35 and screw 36 hold the retaining member 38 between them. A top plate 39 has a press fit on the shaft 35 and cooperates with the retaining member 38 to retain the blades 26. The form shown in Fig. 8 is similar to that of Fig. 7 except that the top plate 39 is fitted on the shank of the screw 36 instead of on the shaft 35, and therefore the retaining member 38 and plate 39 are held between the end of the shaft 35 and the head of the screw 36.

The agitator of Fig. 10 is similar to that of Fig. 6 excepting that the head of the screw 40 is of sufficient diameter to serve in lieu of a bottom plate 37 to cooperate with the retaining member 23 to retain the blades 26.

The agitator shown in Fig. 11 embodies the several parts shown in Fig. 6, but the shaft 41 is spun over at 41' to hold the bottom plate 37 in position. The retaining member 23 has a press fit on the shaft 41.

In Fig. 12, the retaining member 23 and bottom plate 37 have a press fit on the shaft 42, whereas in Fig. 13, said parts 23 and 37 are press fitted on the tapered plug 43 screw threaded at 44 into a shaft 45.

The agitators shown in Figs. 14 and 16 embody an internally screw threaded shaft, a screw 47, a retaining member 48 having downwardly and inwardly bent arms 49, and the blades 26. The member 48 with arms 49 functions as does the member 23 with plate 37 to retain the blades 26. In this embodiment, the retaining member 48 is held between the shaft 46 and head of the screw 47 but it may be press fitted on the shaft.

The agitator shown in Fig. 15 resembles that in Fig. 11 excepting that the shaft 41 is provided with an offset portion which forms a shoulder 50 for holding the retaining member 23 on the plate 37.

Fig. 17 shows an agitator like that shown in Fig. 14 excepting that the retaining member 48 is reversed as indicated at 51, the arms 52 extending upwardly and inwardly.

The agitator shown in Fig. 18 embodies the shaft, headed screw and retaining member shown in Fig. 2, but blade members 53 have been substituted for blades 26.

The agitator shown in Figs. 19–21, inclusive, differs from those previously described in that the blades are not slotted, the retaining member in this construction being slotted to receive specially formed blades. The shaft 35, screw 36 and plate 37 resemble similarly numbered parts shown in Fig. 6, but instead of the particular cruciform retaining member 23, there has been substituted a slightly different retaining member 54 slotted at 55 to provide arched arms similar to the cruciform arms of the other retaining members, under which arms the extended portions 57 of the blades 56 are loosely positioned so that the pivotal point between the blades and arched arms may shift during the movement of the blades from nested to extended positions.

An important advantage of the invention is the fact that the several parts of the agitator, namely, the screws, blades and retaining members may be manufactured separately and assembled as a unit, with the parts in substantially diametric balance, and the unit secured to the bottom of the shaft.

Changes may be made in details of construction without departing from the scope of my invention.

I claim:

1. A drink mixer comprising a rotatably mounted agitator shaft, means for rotating the shaft, a centrally apertured retaining member having a plurality of arched arms mounted on the shaft, agitator blades having pivotal means loosely engaged beneath said arms and bodily movable relative to said arms, and means for retaining the blades on said arched arms, whereby each blade is caused to pivotally embrace an arm at all points throughout its arched extent in moving radially from a nested position adjacent the shaft to an extended position on said arm.

2. A drink mixer comprising a rotatably mounted agitator shaft, means for rotating the shaft, a centrally apertured retaining member having a plurality of arched arms mounted on the shaft, a plate mounted on the shaft in contact with the ends of the arched arms, and agitator blades loosely retained between said arms and plate and movable bodily relatively to said arms about a movable pivotal point for moving from radially extending positions on said arms to nested positions adjacent said shaft.

3. A drink mixer comprising a rotatably mounted agitator shaft, means for rotating the shaft, a centrally apertured cruciform retaining member having a plurality of arched arms mounted on the shaft, a headed shank in the end of the shaft, the ends of said arched arms contacting the head of the shank, and agitator blades loosely retained between said arms and said headed shank and movable bodily relatively to said arms about a movable pivotal point for moving from radially extending positions on said arms to nested positions adjacent said shaft.

4. A drink mixer comprising a rotatably mounted agitator shaft, means for rotating the shaft, a centrally apertured retaining member having a plurality of arched arms mounted on the shaft, slotted blades loosely retained by said arms which extend through said slots, and means for retaining the blades on said arched arms, said blades being movable bodily relatively to said arms about a movable pivotal point for moving from radially extending positions on said arms to nested positions adjacent said shaft.

5. A drink mixer comprising a rotatably mounted agitator shaft, means for rotating the shaft, a centrally apertured retaining member having a plurality of arched arms mounted on the shaft, a plate mounted on the shaft in contact with the ends of the arched arms, said plate and retaining member having a press fit on the shaft, and agitator blades loosely retained between said arms and plate and movable bodily relatively to said arms about a movable pivotal point for moving from radially extending positions on said arms to nested positions adjacent said shaft.

THOMAS B. MYERS.